May 9, 1939. W. J. VOIT ET AL 2,157,580
PROCESS OF MAKING A REINFORCED BALL
Filed Jan. 7, 1938
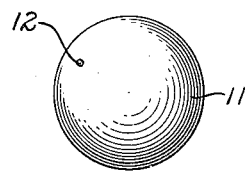
Fig. 1.
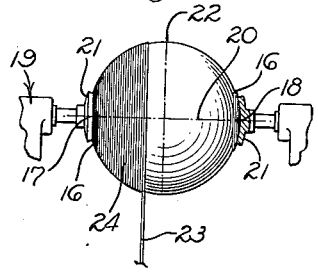
Fig. 5.
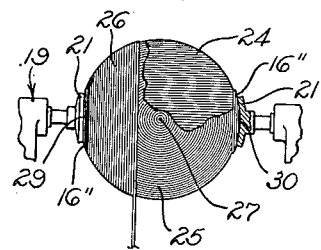
Fig. 9.
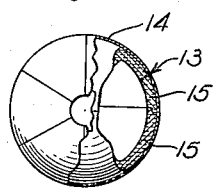
Fig. 2.
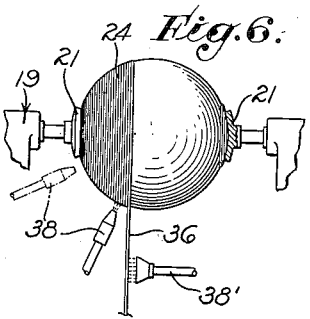
Fig. 6.
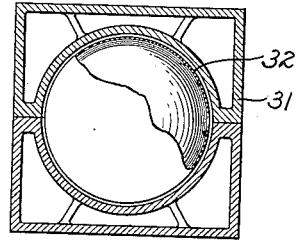
Fig. 10.
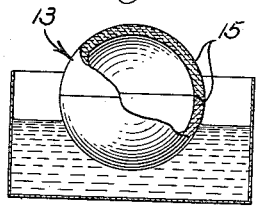
Fig. 3.
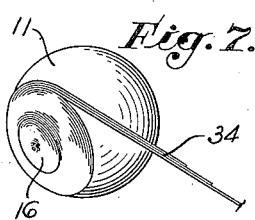
Fig. 7.
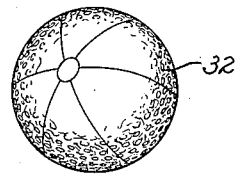
Fig. 11.
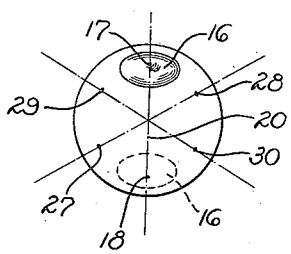
Fig. 4.
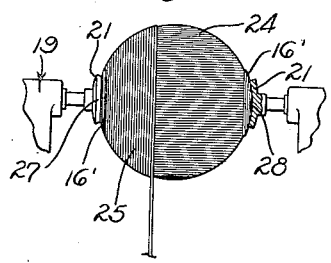
Fig. 8.
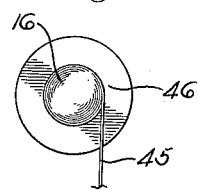
Fig. 12.
INVENTORS
WILLIAM J. VOIT
LEITH C. WEIMER
BY
HARRIS, KIECH, FOSTER & HARRIS
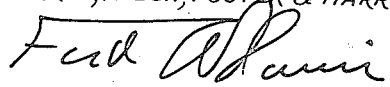
ATTORNEYS Patented May 9, 1939

2,157,580

UNITED STATES PATENT OFFICE 2,157,580

PROCESS OF MAKING A REINFORCED BALL

William J. Voit, Los Angeles, and Leith C. Weimer, Southgate, Calif., assignors, by mesne assignments, to W. J. Voit, Los Angeles, Calif.

Application January 7, 1938, Serial No. 183,898

10 Claims. (Cl. 154—19)

This application is a continuation-in-part of our application, Serial No. 178,748, entitled Reinforced ball and method of making same, filed December 8, 1937.

The article produced by the method claimed herein is the subject of our application for patent, Serial No. 262,792, filed March 18, 1939.

Attention is also called to our application Serial No. 173,158, filed Nov. 6, 1937, which contains claims which relate to this invention.

This invention relates to athletic balls.

It relates particularly to that class of resilient, flexible, hollow athletic balls which comprise a central bladder having a relatively thin rubber wall and provided with a valve whereby the ball may be repeatedly inflated and deflated, an intermediate wall of relatively non-stretchable material, to give the ball a definite size and shape, largely irrespective of the degree of inflation, and an outer protective covering of rubber, leather or other material, to resist surface abrasion and wear.

In these athletic balls, it is desirable to provide an intermediate, relatively non-stretchable wall which shall act as a reinforcement which shall resist internal pneumatic pressure and shall prevent enlargement of the ball, either a uniform enlargement undesirably increasing its diameter or a localized enlargement deforming it from its proper shape, spherical or otherwise, and shall hold the ball to a substantially constant diameter irrespective of the degree of internal pneumatic pressure applied. In prior practice, this intermediate reinforcing layer has been constructed in two fashions. Either woven textile material has been cut to small pieces of various configurations and applied to the inner bladder of the ball or to a form, and bonded in lapped or butted joints with suitable bonding material, such as vulcanizable rubber cement; or, elongated fibrous material, such as thread or yarn, has been wound upon the inner bladder or upon a form in great circles and circles approximating great circles crossing and re-crossing each other in every direction.

It has been found difficult and expensive to employ the first method, since, when flat pieces of fabric are laid upon a curvilinear surface, either the central portion of each piece is stretched more than the edge portions or the edge portions present folds. Correspondingly, either the bladder is deformed or the reinforcing layer is of uneven thickness. It has also been found difficult with this method to firmly unite contiguous pieces of fabric. Lap joints present an uneven surface which gives the ball uneven resiliency. Butt joints require accuracy in cutting and fitting the pieces and also such joints are difficult to make so as to afford a strong tension-resisting union.

In using the second method of winding thread in great circles, it has been found difficult to wind the thread upon a bladder, because of the non-rigid character of the bladder, and even when the thread is wound upon a solid form, the resultant layer presents an uneven erose surface, upon which it is difficult to mold or apply a cover; furthermore the body of the layer contains interstices and is relatively thick, heavy and stiff for any given degree of tensile strength.

In following our invention thread, cord, yarn, strips of fabric or other elongated material, preferably rubberized either before or after application, is wound upon a substantially spherical rubber bladder, preferably without tension, in contiguous coils or convolutions of gradually increasing diameter, and preferably in a continuous spiral, beginning at one polar point and passing over the median equatorial great circle, and then in circles of gradually decreasing diameter until the opposite polar point is reached. This winding produces a layer of an even thickness, which is equal to the diameter of the thread, cord or yarn or to the thickness of the fabric as the case may be. A second winding is then applied to the first winding, with its polar axis perpendicular to the polar axis of the first winding. A third winding is then applied to the second winding, with its polar axis perpendicular to both the first two axes. It is an object of our invention to provide by this construction a reinforcing layer which shall have with a minimum of thickness and weight a maximum of pliability and tensile strength in all directions, and which shall have a smooth exterior face upon which to apply a leather or rubber cover. It is also an object of our invention to provide by this method, a rapid, simple and workmanlike way of applying the thread, with a minimum of labor, to an inflated bladder or to a form. When the elongated material is wound without appreciable tension, our method has an advantage in that the flexible bladder is not pressed in or distorted thereby.

It is a further object of our invention to provide an intermediate reinforcing wall of stretched, elongated fibrous material which will not be subject to additional stretch under conditions of use, and to provide a method of stretching the elongated fibrous material.

In the preferred form of our invention, the reinforcing layers formed of rubberized thread wound as above described surround a rubber bladder and are covered with a rubber cover, and the whole is vulcanized into one integral structure, either by one operation after the several elements of the ball are completely assembled, or in a series of vulcanizing operations at various stages in the building of the ball. It therefore is a further object of our invention to provide a ball which shall combine inflatability, tensile strength, light weight, pliability and uniform elasticity, with resistance to abrasive wear and deformation, and resistance to internal breakdown. It is a further object to provide a practical, inexpensive method of manufacturing a ball with these qualities.

While the principle features of our invention is usuable with any type of outer cover, we prefer to make the outer cover of rubber, which not only resist surface wear, better than leather or other materials, but provides a water-proof casing for the ball which prevents the entrance of water, dirt and other deleterious matter into the substance of the intermediate layer, where such foreign matter would cause decay and mechanical destruction with resultant disintegration of the material of this intermediate layer.

Other objects and advantages of our invention will be disclosed and apparent from the following description and drawing, of which:

Fig. 1 shows a bladder, inflated preparatory to the manufacture of an athletic ball in accordance with the principles of our invention.

Fig. 2 shows partly in section a ball form with a bladder placed thereon.

Fig. 3 shows a form in process of being dipped in a liquid rubber bath to make a bladder.

Fig. 4 shows a bladder with polar discs, applied thereto.

Fig. 5 shows a bladder mounted in a lathe and with a portion of the primary winding in place.

Fig. 6 shows a modified means of rubberizing the thread of the winding.

Fig. 7 shows a modified method of feeding the thread to the ball.

Fig. 8 shows the bladder in a lathe, with the primary winding complete and a portion of the secondary winding in place.

Fig. 9 illustrates the manner of applying the tertiary winding.

Fig. 10 shows the ball in a vulcanizing mold after application of all three windings and rubber cover.

Fig. 11 shows the completed ball.

Fig. 12 shows a plan view of a machine for making the polar discs used in manufacturing the ball.

In the following description, it will be convenient for reference purposes to speak of the poles and the equator of an athletic ball.

It will also be convenient to refer to latitudinal coils or convolutions. These latitudinal coils or convolutions are the "latitudinal windings" illustrated in Figures 5, 6 and 8 of the drawing. Hence the coils or convolutions are "latitudinally wound" upon the bladder, and this term as used hereinafter means that the windings extend in a direction transverse to an imaginary axis through opposite polar points of the bladder, or in other words, that all parts of a given coil or convolution are a substantially equal distance from either of the opposite polar points.

The term "hollow athletic ball" as used herein is intended to include any hollow ball capable of repeated inflation and deflation and used for play or exercise or athletic purposes, such as footballs, basket balls, volley balls, soccer balls and push balls.

While the ball depicted in the drawing is spherical our invention is also applicable to athletic balls which are either elliptical in longitudinal cross section or of some other shape suitable to the purpose for which they are designed. Whenever words applicable to a spherical ball appear in this description, it will be understood that it is for convenience of description only, and that corresponding words applicable to some other shape may be substituted throughout.

Fig. 1 shows a cured or semi-cured rubber bladder 11 having an inflating valve 12 of standard construction. This bladder is inflated to a size having a radius which is less than the radius of the finished ball by an amount slightly greater than the total thickness of the layer or layers of material which are to be applied thereto in subsequent steps of manufacture. Instead of an air-filled bladder 11, there may be provided, as a core upon which to build the ball, a hollow thin-walled uncured rubber ball or bladder 14 formed in any suitable manner, from segments or otherwise, upon a solid form 13. This form may be integral, but we prefer to make it in two hemispherical shells 15 fitted together at their rims to prevent relative displacement and held together by the ball 14. The material of the form 13 is a substance such as cetyl alcohol, certain waxes, paraffines, and other substances which have a temperature of liquefaction somewhere between the atmospheric temperature of the manufacturing room and the temperature of vulcanization.

The bladder or thin rubber wall, constituting the innermost wall of the ball in the preferred form of our invention, may be an air-filled bladder, as shown in Fig. 1, or a segmented wall pieced together on a form of solid alcohol or similar material, as shown in Fig. 2, or its may be a one-piece seamless wall formed by alternately dipping and drying a two-part form of solid alcohol in a bath of latex or of a solution of cured latex until a wall of the desired thickness has been formed as shown in Fig. 3.

Two small discs 16 are made by feeding from a winding machine (not shown) a thread 45 coated with rubber cement to a revolving plate 46 in the manner illustrated in Fig. 12, preferably beginning at the center of the plate and working outwardly until a disc of relatively small diameter has been made, or these discs 16 may be small circular pieces cut from woven fabric. They are applied to the bladder, which has been previously coated with rubber cement, at two polar points diametrically opposite each other, as indicated at 17 and 18, Fig. 4, and adhere thereto through the action of the rubber cement. The bladder is then placed in a lathe 19, with the axis 20 of the polar points 17, 18 coincident with the axis of the lathe, and the discs 16 in position under lathe chucks 21. The diameter of the discs is slightly larger than that of the chucks.

Thread, cord, yarn, strips of fabric, or similar elongated fibrous material 23, is wound upon the bladder from a thread feeding machine (not shown) in contiguous latitudinal coils or convolutions, beginning at the edge of one disc 16 and continuing up and over the equatorial great circle 22 and down to the other disc 16. Preferably, this thread is "rubberized" by coating the same with latex or other rubber cement material prior to its application to the ball. The thread may be passed through a bath of the coating material as it passes from the feeding machine to the bladder, or the thread may be sprayed with the material just as it is applied to the bladder, or the bladder may be dipped in the material before or after it has received its first winding of thread and has been removed from the lathe 19.

A dry uncoated thread 36 (Fig. 6) may be fed to this bladder after the polar discs have been placed thereon in position under the chucks 21 of the lathe 19. Liquid rubber cement may then be sprayed from a gun 38 which is moved in timed relationship with the winding machine from which the thread 36 is proceeding, so that the outer surface of the layer of thread will be thoroughly coated with cement after application to the bladder. This spray method of coating the thread has the advantage of more completely filling the longitudinal, outwardly facing, spaces between the contiguous coils of thread than when pre-coated thread is used.

A spray gun 38' may be mounted to apply the rubber cement to the thread at a point between the winding machine and the ball so as to coat all surfaces of the thread.

The thread may be wound upon the ball in a single strand or two or more contiguous strands may be fed to the ball as it turns in the lathe. Fig. 7 is a perspective showing of a ball to which three strands of thread 34 are being fed by a winding machine.

This first or primary winding is designated in the drawing with the numeral 24. The bladder, after the primary winding 24 of rubberized thread has been completed, is removed from the lathe and two additional small discs 16' are applied to the outer surface of the winding 24 at two diametrically opposite polar points 27 and 28 at an angular distance of 90° from the first polar points 17 and 18. The axis connecting points 27 and 28 is perpendicular to the axis connecting points 17 and 18. The bladder is then replaced in the lathe 19, or in a similar lathe, with discs 16' against the lathe chucks 21. A secondary winding 25 is then applied in the same manner as before.

After the secondary winding has been completely applied, the ball is removed from the lathe, two additional discs 16'' are applied to the ball at two diametrically opposite points 29 and 30 of which the connecting axis is perpendicular to both the axes of points 17 and 18 and points 27 and 28. A tertiary winding 26 of thread is applied in the same manner as were the primary and secondary windings and the ball is removed from the lathe.

It is apparent that if the several layers or plies of thread-windings are applied with their axes perpendicular, as has just been described, not less than three such plies should be formed on the ball to give it a tensile strength of equal degree in every direction. While it is within the scope of our invention to form a ball with any number of plies of latitudinal coils, in practice the number of plies will be three, six, or some other multiple of three. Since no coil of a given ply crosses any other coil, it is also apparent that each ply is of uniform thickness at all points and that this thickness is equal to the diameter of the thread or the thickness of the yarn or other elongated fibrous material used.

If the ball is elliptical in longitudinal cross section, the axis of one of the windings will be the long axis of the ellipse and the other two axes will be perpendicular thereto at its midway point. However, in producing the ordinary football which is ellipsoidal in shape, it is necessary to wind the material in one or more layers about the long axis only, since the portion of the ball midway of its ends, due to its greater radius of curvature, offers less resistance to internal pressure than the end portions. The end portions may be reinforced by fabric or cord, or both, before the ball is wound or after it is wound, and before the cover is applied.

A leather cover can be adhesively applied to the outermost winding of thread or cord, or if it is desired, in accordance with the preferred form of our invention to complete the ball with a rubber cover, the outermost winding of thread or cord is coated with rubber cement, and the material 32 of the cover is applied to this outermost winding in any suitable manner. The ball is then placed in a mold, such as shown at 31, Fig. 10. This mold is slightly larger than is the ball after the material for the rubber cover has been applied. This difference in size between the mold and the ball makes it possible to inflate the ball through the valve 12, and force the outer wall thereof into intimate contact with the inner face of the mold.

We so correlate the maximum stretch capacity of the thread or cord used in the latitudinal windings, with the difference in diameters of the ball and mold, that when we place the ball in the mold and inflate it sufficiently to bring its outer face into intimate contact with the inner face of the mold, the thread or cord is given approximately its maximum stretch and it is substantially incapable of being stretched additionally without rupture. We then apply vulcanizing heat to the ball, which is thereby given a permanent form and a permanent size, which is the same as that of the mold.

The thread or cord, due to its surface coating of rubber cement or similar material, and due to its impregnation with this material, is incorporated in the wall of the ball, so as to be immovable therein. This incorporation takes place at a time when the thread or cord is stretched, and it will not be subject to any appreciable additional elongation under conditions of use. It is not possible with an intermediate reinforcing wall of segmented fabric to attain the same degree of success which we attain in securing this result, since in our construction the elongated threads are continuous, and without breaks such as exist between the segments of woven fabric. When, in a ball constructed of woven fabric, it is attempted to overcome this difficulty by lapping the joints, and securing them by lacing or a partially vulcanized cement bond, the cost of manufacture is increased and ridges are presented which lessen the uniformity of pliability and resiliency of the ball.

If a form 13, such as is shown in Fig. 2, is used in building up the ball, the heat of vulcanization will melt it and it can be drained from the interior of the ball through the valve 12.

It will be understood that it is not necessary in order to provide a construction in which stretched cords or threads are imbedded permanently in vulcanized rubber, that the ball be encased in a rubber cover. It is common practice to make athletic ball "centers", which may be made in one manufacturing plant and sold to a second manufacturer who covers the center with a rubber or leather cover, or, the centers can be made and later covered with either rubber or leather material in the same manufacturing plant according to the requirements of the trade.

These centers can be vulcanized before they are covered. The cement coating of the cords or threads or other elongated fibrous material can then be relied upon to imbed and fix the stretched fibrous material during the process of vulcanization. If the material is liberally coated with a layer of rubber cement or raw rubber in some other form, a better result will be obtained. If a rubber cover is to be applied to the ball in a vulcanizing mold, the size of this latter mold can be gauged to additionally stretch the elongated fibrous material and fix it while subjected to this additional elongation.

Fig. 11 shows the completed ball after removal from the mold. If the face of the mold is formed with the design in relief, the rubber cover of the ball may be molded to have an exterior surface imitative of the grain and seams of a leather-covered ball.

In a ball constructed in accordance with our invention we have an inner gas retaining rubber lining equipped with a valve structure by which the original bladder can be given the proper size for having wound thereon the threads of the intermediate reinforcing layer, by which the ball can be expanded in the mold to secure accurate molding and stretching of the thread windings, and by which the ball can be inflated to any desired degree for play purposes. We also have an intermediate flexible, pliable, relatively thin, relatively light, tension resisting wall of continuously wound stretched threads, which will not stretch further when the ball is in use, and will ensure a ball of constant diameter and true shape, irrespective of repeated inflation and deflation and irrespective of variation in the pressure of such inflation. And we have an outer protective cover to resist abrasive wear or puncture. The three walls are permanently secured by vulcanization or other means in one integral structure, which can be inflated or deflated at will. A ball constructed in accordance with our invention can be given more or less rigidity according to the pressure of inflation, without change in the diameter of the ball.

It is obvious that the various layers of coils of latitudinally wound thread, or other elongated reinforcing material, may be successively applied to the ball with the axis of the coils of one layer at any angle to the axis of the coils of the preceding or following layers and need not be perpendicular thereto, as has been above specified in describing the preferred embodiment of our invention.

The essence of our invention resides in the latitudinal arrangement of coils of elongated reinforcing material to resist tensile stresses circumferentially in a hollow athletic ball, having an integral rubber, gas retaining lining and capable of repeated inflation.

If a leather covered basket ball, football or soccer ball is manufactured with an underlying reinforcing layer constructed in accordance with our invention, the thickness of the leather casing may be substantially less than is the present practice, since this reinforcing layer acts to resist the internal air pressure, which in balls as at present constructed is withstood by a heavy, thick leather cover. Thin leather stock may be cut in panels, which will lie flat on the surface of the balls, and these panels may be fixed in position by vulcanization or by the use of an adhesive.

While we have described several embodiments of our invention, we do not wish to be limited to these embodiments but have defined our invention in the following claims.

We claim as our invention:

1. The method of making an inflatable and deflatable athletic ball, comprising: taking an inflated rubber bladder having an inflating valve permanently secured thereto and winding reinforcing layers of elongated rubberized fibrous material in latitudinal contiguous convolutions upon said bladder; applying material for an outer protective cover to said wound bladder; placing said wound bladder and cover material in a mold having a cavity of a size greater than the volume of said wound bladder and cover material; further inflating said wound bladder to thereby stretch said fibrous material; vulcanizing said wound bladder and cover material together while said fibrous material is in a stretched condition; and deflating and removing the vulcanized, wound and covered bladder from said mold.

2. The method of making an inflatable and deflatable athletic ball, comprising: taking a rubber bladder having an inflating valve permanently secured thereto and inflating said bladder to a low pressure; reinforcing said bladder by winding a layer of elongated rubberized fibrous material upon said bladder so that the convolutions thereof are in contiguous relation and extend transverse to an imaginary axis through said bladder; similarly winding a second and a third layer of reinforcing material upon said bladder so that the imaginary axes about which the convolutions of said second and third layers are wound are perpendicular to each other, and each of said axes is perpendicular to said axis about which the convolutions of said first layer are wound; applying rubber material for an outer cover to said wound bladder; placing said wound bladder and cover material in a mold having a cavity of a size greater than the volume of said wound bladder and cover material; inflating said wound bladder to a relatively high pressure to press said cover material into intimate contact with the inner walls of said mold to thereby stretch said fibrous reinforcing material; vulcanizing said bladder, reinforcing material and cover together while said reinforcing material is in a stretched condition; and deflating and removing the vulcanized wound bladder and cover from said mold.

3. The method of making an inflatable and deflatable athletic ball center, comprising: taking an inflated rubber bladder having an inflating valve permanently secured thereto and winding a thread of rubberized fibrous material in latitudinal contiguous convolutions upon said bladder; placing said wound bladder in a mold having a cavity of a size larger than said wound bladder; further inflating said wound bladder to press said rubberized fibrous material into intimate contact with the inner walls of said mold and thus stretch said fibrous material; vulcanizing said wound bladder while said fibrous material is in a stretched condition; and deflating and removing the vulcanized wound bladder from said mold.

4. The method of making an inflatable and deflatable athletic ball center, comprising: taking an inflated rubber bladder having an inflating valve permanently secured thereto and winding elongated fibrous material upon said bladder without substantial tension; placing said wound bladder in a mold having a cavity of a size larger than said wound bladder; further inflating said wound bladder to press the fibrous material into intimate contact with the inner walls of said mold and thus place said fibrous material under tension; vulcanizing said wound bladder while said fibrous material is under tension; and deflating and removing the vulcanized wound bladder from said mold.

5. The method of making an inflatable and deflatable athletic ball center, comprising: taking a rubber bladder having an inflating valve permanently secured thereto and inflating said bladder to a low pressure; successively winding at least three layers of reinforcing material upon said bladder, each of said layers comprising elongated rubberized fibrous material arranged in latitudinal contiguous convolutions with the convolutions of the respective layers disposed at an angle relatively to each other; placing said wound bladder in a mold having a cavity of a size larger than said wound bladder; inflating said wound bladder to a relatively high pressure to press said reinforcing fibrous material into intimate contact with the inner walls of said mold to thereby stretch said fibrous material; vulcanizing said wound bladder while said fibrous material is in a stretched condition; and deflating and removing the vulcanized wound bladder from said mold.

6. The method of making an inflatable and deflatable athletic ball, comprising: taking an inflated rubber bladder having an inflating valve permanently secured thereto and winding reinforcing layers of elongated rubberized fibrous material in latitudinal contiguous convolutions upon said bladder; applying rubber material for an outer protective cover to said wound bladder; placing said wound bladder and cover material in a mold having a cavity of a size greater than the volume of said wound bladder and cover material; further inflating said wound bladder to thereby stretch said fibrous material; vulcanizing said wound bladder and rubber cover material together while said fibrous material is in a stretched condition; and deflating and removing the vulcanized, wound and covered bladder from said mold.

7. The method of making an inflatable and deflatable athletic ball, comprising: taking an inflated rubber bladder having an inflating valve permanently secured thereto and winding reinforcing layers of elongated fibrous material in latitudinal contiguous convolutions upon said bladder; applying material for an outer protective cover to said wound bladder; placing said wound bladder and cover material in a mold having a cavity of a size greater than the volume of said wound bladder and cover material; further inflating said wound bladder to thereby stretch said fibrous material; vulcanizing said wound bladder and cover material together while said fibrous material is in a stretched condition; and deflating and removing the vulcanized, wound and covered bladder from said mold.

8. The method of making an inflatable and deflatable athletic ball center, comprising: taking an inflated rubber bladder having an inflating valve permanently secured thereto and winding elongated fibrous material upon said bladder; placing said wound bladder in a mold having a cavity of a size larger than said wound bladder; further inflating said wound bladder to press the fibrous material into intimate contact with the inner walls of said mold and thus place said fibrous material under tension; vulcanizing said wound bladder while said fibrous material is under tension; and deflating and removing the vulcanized wound bladder from said mold.

9. The method of making an inflatable and deflatable athletic ball center, comprising: taking an inflated rubber bladder having an inflating valve permanently secured thereto and winding elongated fibrous material upon said bladder in latitudinal contiguous convolutions; placing said wound bladder in a mold having a cavity of a size larger than said wound bladder; further inflating said wound bladder to press the fibrous material into intimate contact with the inner walls of said mold and thus place said fibrous material under tension; vulcanizing said wound bladder while said fibrous material is under tension; and deflating and removing the vulcanized wound bladder from said mold.

10. The method of making an inflatable and deflatable athletic ball center, comprising: taking an inflated rubber bladder having an inflating valve permanently secured thereto and winding elongated fibrous material upon said bladder in latitudinal contiguous convolutions without substantial tension; placing said wound bladder in a mold having a cavity of a size larger than said wound bladder; further inflating said wound bladder to press the fibrous material into intimate contact with the inner walls of said mold and thus place said fibrous material under tension; vulcanizing said wound bladder while said fibrous material is under tension; and deflating and removing the vulcanized wound bladder from said mold.

WILLIAM J. VOIT.
LEITH C. WEIMER.

CERTIFICATE OF CORRECTION.

Patent No. 2,157,580.

May 9, 1939.

WILLIAM J. VOIT, ET AL.

It is hereby certified that error appears in the printed specification of the above numbered patent requiring correction as follows: Page 2, first column, line 17, for the word "features" read feature; line 18, for "usuable" read usable: line 20, for "resist" read resists; page 3, first column, line 72, after the word "coil" and before the comma, insert of said ply; and that the said Letters Patent should be read with this correction therein that the same may conform to the record of the case in the Patent Office.

Signed and sealed this 11th day of July, A. D. 1939.

(Seal)

Henry Van Arsdale
Acting Commissioner of Patents.